United States Patent
Nagasaka et al.

(10) Patent No.: US 9,475,491 B1
(45) Date of Patent: Oct. 25, 2016

(54) LANE CHANGING FOR AUTONOMOUS VEHICLES

(71) Applicant: Toyota Motor Engineering & Manufacturing North America, Inc., Erlanger, KY (US)

(72) Inventors: Naoki Nagasaka, Ann Arbor, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/732,958

(22) Filed: Jun. 8, 2015

(51) Int. Cl.
| | | |
|---|---|---|
| *B60W 30/00* | (2006.01) | |
| *B60W 30/16* | (2012.01) | |
| *B60W 30/18* | (2012.01) | |

(52) U.S. Cl.
CPC ............. *B60W 30/00* (2013.01); *B60W 30/16* (2013.01); *B60W 30/18163* (2013.01); *B60W 2520/00* (2013.01); *B60W 2550/30* (2013.01)

(58) Field of Classification Search
CPC ............. B60W 30/00; B60W 30/16; B60W 30/18163; B60W 2550/30; B60W 2520/00
See application file for complete search history.

(56) References Cited

U.S. PATENT DOCUMENTS

| | | | | |
|---|---|---|---|---|
| 5,521,579 A | * | 5/1996 | Bernhard | ........... B60K 31/0008 180/167 |
| 8,165,776 B2 | | 4/2012 | Sugawara et al. | |
| 2005/0187713 A1 | * | 8/2005 | Yamamura | ............. G08G 1/167 701/301 |
| 2011/0130936 A1 | * | 6/2011 | Noda | ..................... G08G 1/167 701/70 |
| 2012/0310465 A1 | * | 12/2012 | Boatright | ............... B60Q 1/346 701/25 |
| 2013/0184926 A1 | | 7/2013 | Spero et al. | |
| 2013/0226432 A1 | * | 8/2013 | Tsuruta | ............... B60W 30/165 701/96 |
| 2014/0207325 A1 | * | 7/2014 | Mudalige | ............. B62D 15/025 701/26 |
| 2015/0321699 A1 | * | 11/2015 | Rebhan | ..................... B60Q 9/00 701/23 |
| 2016/0068156 A1 | * | 3/2016 | Horii | ..................... B60W 30/00 701/28 |

FOREIGN PATENT DOCUMENTS

| | | | |
|---|---|---|---|
| DE | 102012025328 A1 | | 7/2013 |
| JP | 2013-107431 | * | 6/2013 |
| JP | 2014019332 A | | 2/2014 |

* cited by examiner

*Primary Examiner* — Michael J Zanelli
(74) *Attorney, Agent, or Firm* — Christopher G. Darrow; Darrow Mustafa PC

(57) ABSTRACT

Various manners of changing travel lanes for an autonomous vehicle are described. A target gap between a pair of neighboring vehicles located in a travel lane that is adjacent to the current travel lane of the autonomous vehicle can be identified. It can be determined whether the size of the first target gap is acceptable or unacceptable. Responsive to determining that the size of the first target gap is unacceptable, an alternative lane changing maneuver for the autonomous vehicle can be determined. The autonomous vehicle can be caused to implement the alternative lane changing maneuver.

13 Claims, 5 Drawing Sheets

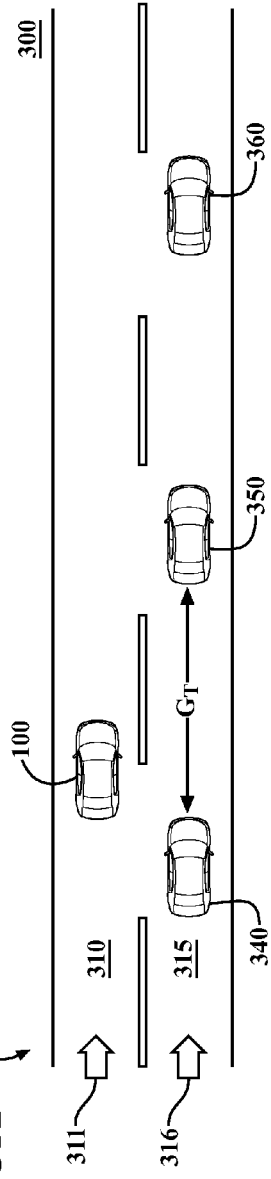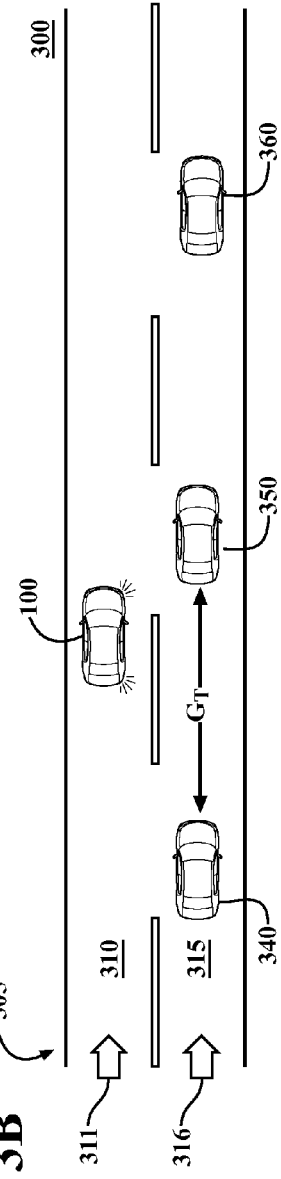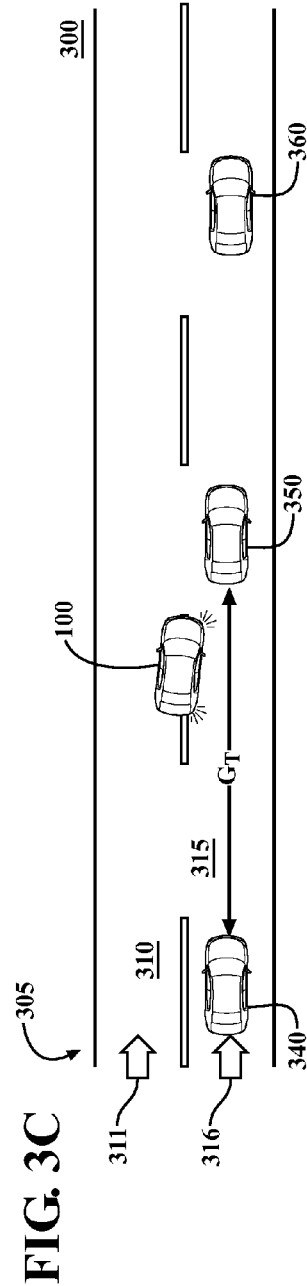

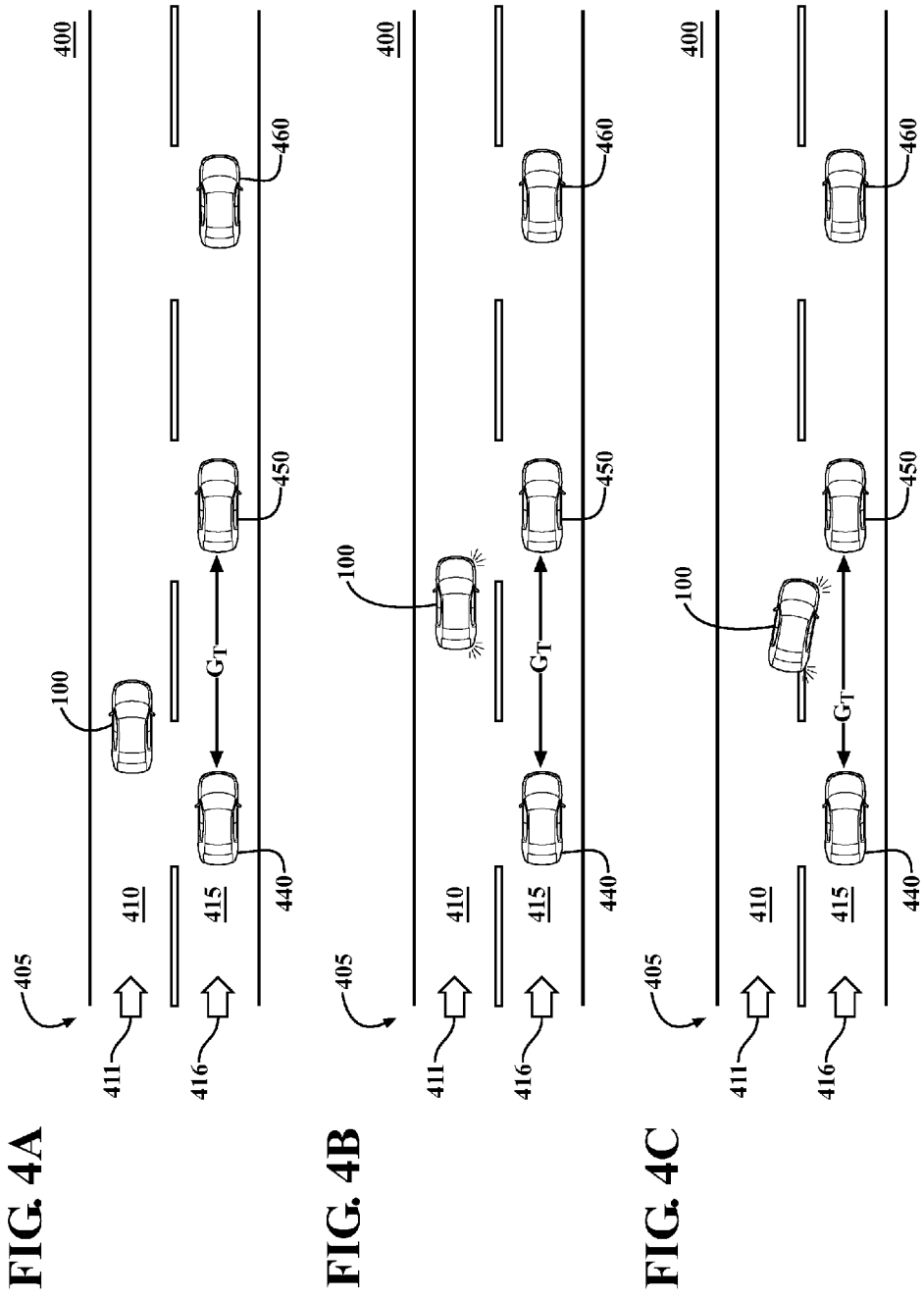

LANE CHANGING FOR AUTONOMOUS VEHICLES

FIELD

The subject matter described herein relates in general to vehicles having an autonomous or highly automated operational mode and, more particularly, to the lane changing operation of such vehicles.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment, including maneuvers to change the travel lane of the vehicle.

SUMMARY

In one respect, the present disclosure is directed to a method of changing travel lanes for an autonomous vehicle. The method includes identifying a first target gap between a first pair of neighboring vehicles located in a travel lane adjacent to the current travel lane of the autonomous vehicle. The first target gap can have an associated size. The method also includes determining whether the size of the first target gap is acceptable or unacceptable. The method further includes, responsive to determining that the size of the first target gap is unacceptable, determining an alternative lane changing maneuver for the autonomous vehicle. The method can include causing the autonomous vehicle to implement the alternative lane changing maneuver.

In another respect, the present disclosure is directed to a system for changing travel lanes for an autonomous vehicle. The system can include a sensor system. The sensor system can be operable to detect objects in an external environment of the autonomous vehicle, such as objects located in a travel lane adjacent to the current travel lane of the autonomous vehicle. The system includes a processor operatively connected to the sensor system. The processor can be programmed to initiate executable operations. The executable operations can include identifying a first target gap between a first pair of neighboring vehicles located in a travel lane adjacent to the current travel lane of the autonomous vehicle. The first target gap can have an associated size. The executable operations can also include determining whether the size of the first target gap is acceptable or unacceptable. The executable operations further includes, responsive to determining that the size of the first target gap is unacceptable, determining an alternative lane changing maneuver for the autonomous vehicle. The executable operations can include causing the autonomous vehicle to implement the alternative lane changing maneuver.

In yet another respect, the present disclosure is directed to a computer program product for changing travel lanes for an autonomous vehicle. The computer program product can include a computer readable storage medium having program code embodied therein. The program code can be executable by a processor to perform a method. The method includes identifying a first target gap between a first pair of neighboring vehicles located in a travel lane adjacent to the current travel lane of the autonomous vehicle. The first target gap can have an associated size. The method also includes determining whether the size of the first target gap is acceptable or unacceptable. The method further includes, responsive to determining that the size of the first target gap is unacceptable, determining an alternative lane changing maneuver for the autonomous vehicle. The method can include causing the autonomous vehicle to implement the alternative lane changing maneuver.

BRIEF DESCRIPTION OF THE DRAWINGS

FIG. 3A-3C is an example of an autonomous vehicle configured to change travel lanes, showing the autonomous vehicle implementing one example of a lane change operation.

FIG. 4A-4C is an example of an autonomous vehicle configured to change travel lanes, showing the autonomous vehicle implementing another example of a lane change operation.

DETAILED DESCRIPTION

Figure 1:
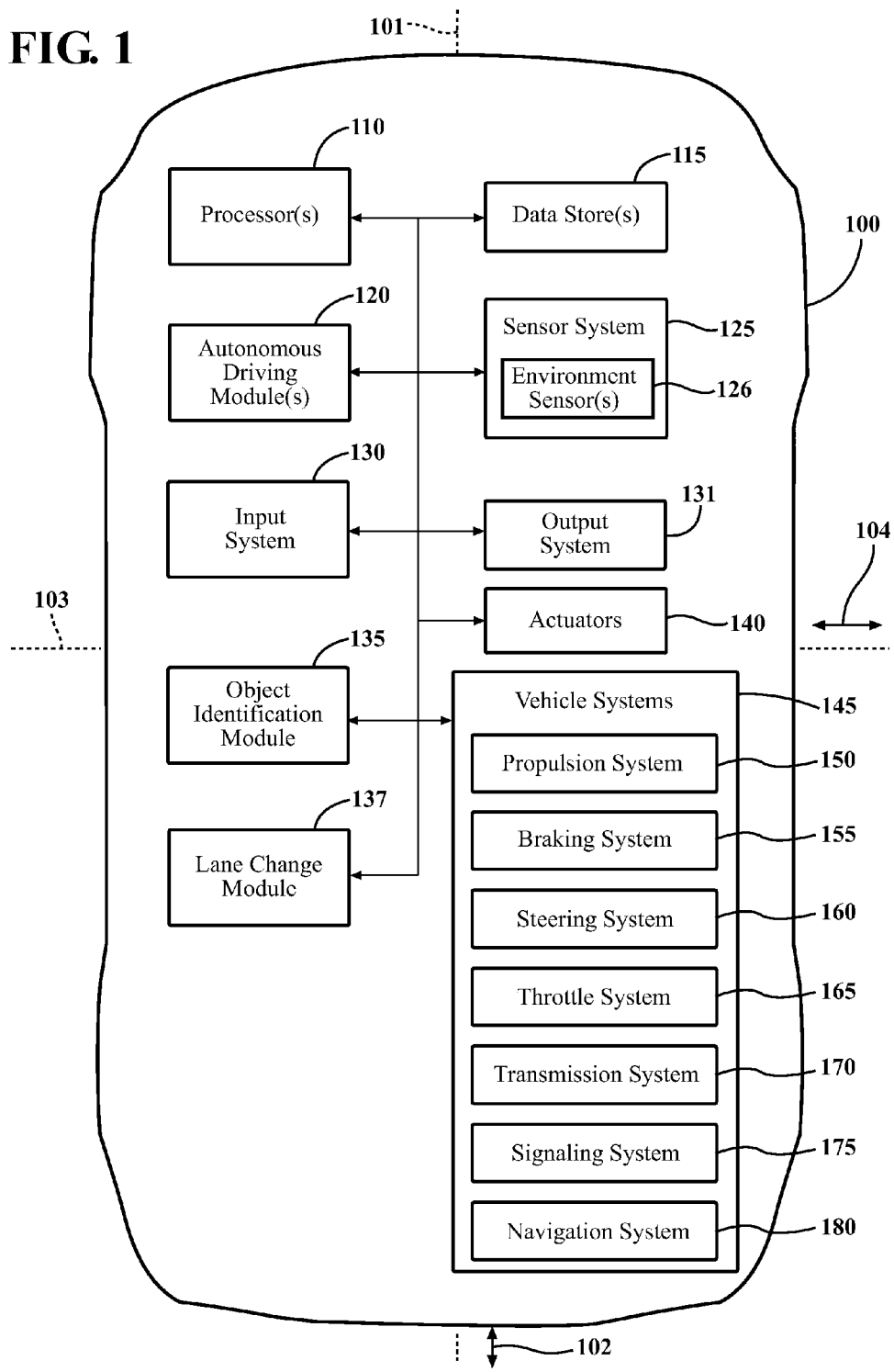
FIG. 1 is an example of an autonomous vehicle configured to change travel lanes.

This detailed description relates to lane changing for autonomous vehicles. A target gap between a pair of neighboring vehicles located in a travel lane adjacent to a current travel lane of the autonomous vehicle can be identified. Responsive to determining that the size of the target gap is unacceptable, an alternative lane changing maneuver for the autonomous vehicle can be determined. The autonomous vehicle can be caused to implement the alternative lane changing maneuver. The present detailed description relates to systems, methods and computer program products that incorporate one or more of such features. In at least some instances, such systems, methods and computer program products can, among other things, improve the performance of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can have an associated longitudinal axis 101, which can be the central axis of the vehicle 100. The vehicle 100 can have an associated longitudinal direction 102. "Longitudinal direction" means any direction that is substantially parallel to and/or co-linear with the longitudinal axis 101. The vehicle 100 can have an associated lateral axis 103, which can be substantially perpendicular to the longitudinal axis 101. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 104. "Lateral direction" means any direction that is substantially parallel to and/or co-linear with the lateral axis 103.

The vehicle 100 can include various elements, some of which can be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement various processes described herein, including, for example, determining an altered travel route for the autonomous vehicle and implementing the determined altered travel route. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g., one or more of vehicle systems 145). Alternatively or in addition, the data store 115 may contain such instructions.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120, and/or one or more other modules and/or elements of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an 02 monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. Various examples of the environment sensors 126 will be described herein. However, it will be understood that the embodiments are not limited to the particular sensors described.

In one or more arrangements, one or more of the environment sensors 126 can use at least in part radio signals (e.g., RADAR sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction 102, the lateral direction 104 and/or other direction(s)), the speed of each detected object and/or the movement of each detected object.

In one or more arrangements, one or more of the environment sensors 126 can use at least in part laser signals (e.g., LIDAR sensors). For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction 102, the lateral direction 104 and/or other direction(s)), the speed of each detected object and/or the movement of each detected object.

In one or more arrangements, one or more of the environment sensors 126 can use at least in part ultrasound signals. Such sensors can include an ultrasound source configured to emit ultrasonic signals and a detector configured to detect reflections of the ultrasonic signal. The one or more ultrasound-based environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g., in the longitudinal direction 102, the lateral direction 104 and/or other direction(s)), the speed of each detected object and/or the movement of each detected object. Such detecting can be based on a characteristic (e.g., the intensity) of a reflected ultrasonic signal.

In one or more arrangements, one or more of the environment sensors 126 can include one or more cameras. "Camera" is defined as any device, component, and/or system that can capture at least visual data. "Visual data" includes video and/or image information/data. The visual data can be in any suitable form.

In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture element may capture images in any suitable wavelength on the electromagnetic spectrum. The image capture element may capture color images and/or grayscale images. One or more of the cameras can be configured with zoom in and/or zoom out capabilities.

The one or more cameras can be located in any suitable portion of the vehicle 100. For instance, one or more of the cameras can be located within the vehicle 100. One or more of the cameras can be located on the exterior of the vehicle 100. One or more of the cameras can be located on or exposed to the exterior of the vehicle 100. The position of one or more of the cameras can be fixed such that its position does not change relative to the vehicle 100. One or more of the cameras can be movable so that its position can change to allow visual data from different portions of the external environment of the vehicle 100 to be captured. The movement of such cameras can be achieved in any suitable manner. The cameras can have any suitable range of motion, including, for example, substantially spherical, substantially hemi-spherical, substantially circular and/or substantially linear.

Alternatively or in addition to any of the sensors described above, the sensor system 125 can include other types of sensors. The sensor system 125, the processor 110, and/or one or more of the modules 120, 135, 137 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include an input system 130. An "input system" is defined as any device, component, system, element or arrangement or groups thereof that enable information/data to be entered into a machine. The input system 130 can receive an input from a vehicle occupant (e.g., a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g., a person, a vehicle occupant, etc.). The output system 131 can include a display, as described above. Alternatively or in addition, the output system 131 may include a microphone, earphone and/or speaker. Some components of the vehicle 100 may serve as both a component of the input system 130 and a component of the output system 131.

In one or more arrangements, the vehicle 100 can include an object identification module 135. In one or more arrangements, the object identification module 135 can include artificial or computational intelligence elements, e.g., neural network, fuzzy logic or other machine learning algorithms. In some arrangements, the sensor system 125, the processor 110, and/or the object identification module 135 can be configured to detect, determine, assess, measure, quantify and/or sense, directly or indirectly, one or more dimensions of a detected object. For instance, based on information/data received from one or more sensors of the sensor system 125, a direct measurement of one or more dimensions of a detected object can be determined. Examples of dimensions that can be detected, determined, assessed, measured, quantified and/or sensed, directly or indirectly, include length, width and/or height.

In some arrangements, the sensor system 125, the processor 110, and/or the object identification module 135 can be configured to detect, determine, assess, measure, quantify and/or sense, directly or indirectly, a relative size of at least a portion of a detected object. In this regard, a "large object" is any object that has one or more dimensions greater than a predetermined dimension or is otherwise presumed to be "large" based on one or more factors. A "non-large object" is any object that has one or more dimensions less than a predetermined dimension or is otherwise presumed to be non-large based on one or more factors.

The relative size of a detected object can be determined in any suitable manner. For instance, a detected dimension of the object (e.g., length, width and/or height) can be compared to a predetermined dimension. The predetermined dimension can have any suitable value. In one or more arrangements, if the detected dimension is greater than the predetermined dimension, the object can be determined, classified and/or considered to be a large object. Such a comparison, determination, classification and/or consideration can be made by, for example, the processor 110 and/or the object identification module 135. If the detected dimension is less than or equal to the predetermined dimension, the object can be determined, classified or considered to be a non-large object.

In one or more arrangements, the predetermined dimension can be a predetermined length. In such arrangements, the relative size of a detected object can be determined with respect to the predetermined length. For example, the length of an object can be detected. The detected length of the object can be compared to a predetermined length. The predetermined length can be any suitable length. In one or more arrangements, the predetermined length can be substantially equal to or greater than the length of the vehicle 100. In one or more arrangements, such as in the case of smaller vehicles, the predetermined length can be a value that is greater than the length of the vehicle 100. In some arrangements, if the detected length is greater than the predetermined length, the object can be determined, classified and/or considered to be a large object. If the detected length is less than or equal to the predetermined length, the object can be determined, classified and/or considered to be a non-large object.

Alternatively or in addition, the relative size of the object can be determined based on one or more inputs. For instance, the sensor system 125 can be configured to detect, determine, assess, measure, quantify and/or sense, directly or indirectly, the number of wheels or tires on a side of an object. Based on the number of detected wheels or tires, the processor 110 and/or the object identification module 135 can determine whether the object is a large object. For instance, if more than two wheels are detected on a side of a surrounding object, then it can be determined to be a large object (e.g., a truck).

Alternatively or in addition, the sensor system 125, the processor 110 and/or the object identification module 135 can be configured to detect, determine, assess, measure, quantify and/or sense, directly or indirectly, the size of the wheels or tires of an object. As an example, the wheels or tires of the object can have an associated diameter and/or radius. The size of the wheels or tires can be determined by a direct measurement of a diameter or radius of a wheel or tire. In some arrangements, the detected diameter or radius of the tires or wheels can be compared to a predetermined diameter or radius. The predetermined diameter or radius can be any suitable value. In one or more arrangements, the predetermined diameter or radius can be substantially equal to the diameter or radius of the tires or wheels of the vehicle 100. In one or more arrangements, such as in the case of vehicles with smaller wheels or tires, the predetermined diameter or radius can be a value that is greater than the diameter or radius of the tires or wheels of the vehicle 100. If the detected diameter or radius is greater than the predetermined diameter or radius, the object can be determined to be a large or long object. If the detected diameter or radius is less than or equal to the predetermined diameter or radius, the object can be determined, classified and/or considered to be a non-large object. Such a comparison and/or determination can be made by, for example, the processor 110 and/or the object identification module 135.

The object identification module 135 can include and/or have access to an object image database (not shown). The objects image database can include one or more images of a plurality of different objects (e.g., vehicles) or portions thereof. Arrangements will be described herein in connection with vehicle, but it will be understood that arrangements are not limited to vehicles. Indeed, the object image database can include one or more images of non-vehicular objects. The images may be of one or more portions of the exterior of at least a portion of a plurality of different vehicles. For instance, the images can be of at least a portion of a vehicle. The images can be provided in any suitable format. The vehicle image database can be located on-board the vehicle 100, such as in the data store 115, or it can be located in a source external to the vehicle 100 (e.g., in a cloud-based data store).

As an example, the object identification module 135 can also include any suitable vehicle recognition software or other object recognition software. The vehicle recognition software can analyze an image captured by the sensor system 125. The vehicle recognition software can query the vehicle image database for possible matches. For instance, images captured by the sensor system 125 can be compared to images in the vehicle image database for possible matches. Alternatively or in addition, measurements or other aspects of an image captured by the sensor system 125 can be compared to measurements or other aspects of any images in the vehicle image database. The object identification module 135 can identify the detected object as a particular type of vehicle if there is a match between the captured image and an image in the vehicle database.

In this context, "match" or "matches" means that an image or other information collected by the sensor system and one or more of the images in the vehicle database are substantially identical. For instance, the an image or other information collected by the sensor system and one or more of the images in the vehicle database can match within a predetermined probability (e.g., at least about 85%, at least about 90%, at least about 95% or greater) or confidence level.

The autonomous driving module 120, the object identification module 135, and/or the processor 110 can be configured to analyze data/information, including visual data, captured by the sensor system 125 to identify one or more objects in the external environment of the vehicle 100. In some arrangements, one or more of these elements can be configured to identify the nature of the objects (e.g., whether the object is a vehicle) using any suitable technique, including, for example, template matching and other kinds of computer vision and/or image processing techniques and/or other artificial or computational intelligence algorithms or machine learning methods.

The vehicle 100 can include a lane change module 137. The lane change module 137 can be implemented as computer readable program code that, when executed by a processor, implement the various processes described herein. The lane change module 137 can be a component of the processor 110, or the lane change module 137 can be executed on and/or distributed among other processing systems to which the processor 110 is operatively connected.

The lane change module 137 can be configured to detect, analyze, assess and/or interpret information about a driving environment of the vehicle 100 to determine one or more driving maneuvers that will result in the vehicle 100 changing from its current travel lane to a different travel lane. The different travel lane can be substantially adjacent to the current travel lane of the vehicle 100. The lane change module 137 can be used in various driving scenarios in which the vehicle 100 moves from one travel lane to another. For instance, the lane change module 137 can be used for regular lane changing on a road. In addition, the lane change module 137 can be used in other traffic situations in which where the vehicle 100 is trying to merge with other vehicular traffic that is flowing almost parallel to the vehicles current travel lane. Non-limiting examples of such situations can include merging onto freeway and yielding to merging vehicles.

In some instances, the travel lane into which the vehicle 100 wishes to change may be free of other vehicles, at least in the area near the vehicle 100. In such case, the lane change module 137 can be configured to cause a signaling system of the vehicle 100 to be activated to indicate a desire to change travel lanes. The vehicle 100 can then be caused to move into the travel lane.

In other instances, there may be one or more vehicles in the travel lane into which the vehicle 100 wishes to move. In such case, the lane change module 137 can be configured to identify one or more candidate gaps between neighboring vehicles into which the vehicle 100 can merge. The one or more candidate gaps can be defined between a pair of neighboring vehicles. "Neighboring vehicles" means two vehicles that are in the same travel lane with no other vehicle between them. The gap between the neighboring vehicles can be defined by the distance between them in the travel direction of the travel lane. The pair of neighboring vehicles defining each gap can include a forward vehicle and a rearward vehicle.

The lane change module 137 can be configured to identify one of the candidate gaps as a target gap. The target gap can be identified in any suitable manner based on one or more factors. For instance, target gap can be selected based on its proximity to the current location of the vehicle 100, the current size of the target gap, the location of the target gap relative to a lane change trigger event, the current speed of the vehicle 100, the speed of one or more of the vehicles in the other travel lane, the current location of the vehicle 100, and/or the current location of one or more other vehicles in the other travel lane, just to name a few possibilities. However, it will be understood that the identification of the target gap is not limited to these factors. Indeed, the target gap can be identified based on one or more other factors other than those described. A "lane change trigger event" is any action along that travel route that would require the vehicle to move into a different travel lane to implement. Non-limiting examples of lane change trigger events include turns, exits, lane endings, lane closures, on ramps, and/or off ramps, just to name a few possibilities.

The lane change module 137 can be configured to control the speed of the vehicle 100. The lane change module 137 can be configured to control the speed of the vehicle 100 so that it substantially matches the speed of the forward vehicle of the target gap. The lane change module 137 can be configured to substantially maintain the vehicle 100 at a position relative to the forward vehicle. For instance, the lane change module 137 can be configured to substantially maintain a predetermined forward distance is maintained between the vehicle 100 and the forward vehicle. "Forward distance" means the distance between the vehicle 100 and the forward vehicle in the longitudinal direction 102 of the vehicle 100. The forward distance can be between a forward portion of the vehicle 100 and a rearward portion of the forward vehicle. For instance, the forward portion can be the forward-most point of the vehicle 100 and/or the rearward-most point of the forward vehicle. The lane change module 137 can also be configured to substantially maintain a predetermined lateral distance between the vehicle 100 and the forward vehicle. "Lateral distance" means the distance between the vehicle 100 and the forward vehicle in the lateral direction 104 of the vehicle 100.

The lane change module 137 can be configured to activate a signaling system 175 of the vehicle 100 to indicate an intention of the vehicle 100 to change travel lanes. For instance, the lane change module 137 can be configured to activate the appropriate turn signals of the vehicle 100. Thus, the rearward vehicle and/or the driver of the rearward vehicle of the target gap can be apprised of the intention of the vehicle 100 to change travel lanes.

The target gap can have an associated size. The lane change module 137 can be configured to determine whether the size of the target gap is acceptable or unacceptable. Such a determination can be performed continuously, periodically, or irregularly. "Acceptable" means that the size of the target gap is such that vehicle can safely maneuver into the target gap in the other travel lane. "Safely maneuver" means that there is little or no risk of impinging upon the vehicles forming the gap. Conversely, "unacceptable" means that the size of the target gap is such that vehicle can maneuver into the target gap in the other travel lane at an elevated risk of impinging upon the vehicles forming the gap. The determination of whether the size of the target gap is acceptable or unacceptable can be based on the size of the gap, the speed of the vehicle 100, the speed of the forward and rearward vehicle forming the target gap, and/or the distance to the lane change trigger event, just to name a few possibilities. However, the determination of whether the size of the target gap is acceptable or unacceptable is not limited to these factors. Indeed, such a determination can be made using one or more other factors, alternatively or in addition to any of the factors noted above.

If the lane change module 137 determined that the target gap is acceptable, then the lane change module 137 can be configured to cause the vehicle 100 to merge into the target gap. If the lane change module 137 determines that the target gap is unacceptable, then the lane change module 137 can be configured to determine an alternative lane changing maneuver. In one or more arrangements, the alternative lane changing maneuver can be a less conservative lane change maneuver. A "less conservative lane change maneuver" is one that the vehicle 100 would not normally implement under standard operating conditions. Various examples of a less conservative lane change maneuver less conservatively will be described herein. The less conservative mode still requires safe operation of the vehicle, despite the elevated risk of impinging upon the vehicles forming the gap.

In some arrangements, the sensor system 125, the processor 110, and/or one or more other modules (e.g., modules 120, 135, 137) and/or elements of the vehicle 100 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 135, 137 can be configured to detect, determine, assess, monitor, measure, quantify and/or sense, directly or indirectly, the size, relative size, length, width, height, a dimension, the material, a material property, the speed, the acceleration and/or the trajectory of a detected object. In one or more arrangements, one or more artificial or computational algorithms or machine learning methods can be used for such purposes.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires, and/or tracks. Any suitable type of wheels, tires, and/or tracks can be used. In one or more arrangements, the wheels, tires, and/or tracks of the vehicle 100 can be configured to rotate differentially with respect to other wheels, tires, and/or tracks of the vehicle 100. The wheels, tires, and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide signals to the driver of the vehicle 100 and/or to provide information to drivers of other vehicles with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g., shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 174 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g., laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110, the autonomous driving module 120, the lane change module 137, and/or one or more other elements of the vehicle 100. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for lane changing based on current conditions in the driving environment. In one or more arrangements, responsive to determining that the size of a target gap is acceptable, the vehicle 100 can be caused to implement a standard lane change maneuver. In one or more arrangements, responsive to determining that the size of a target gap is unacceptable, an alternative lane changing maneuver can be determined. The alternative lane changing maneuver can be a less conservative lane changing maneuver while maintaining safe operation of the vehicle 100.

Figure 2:
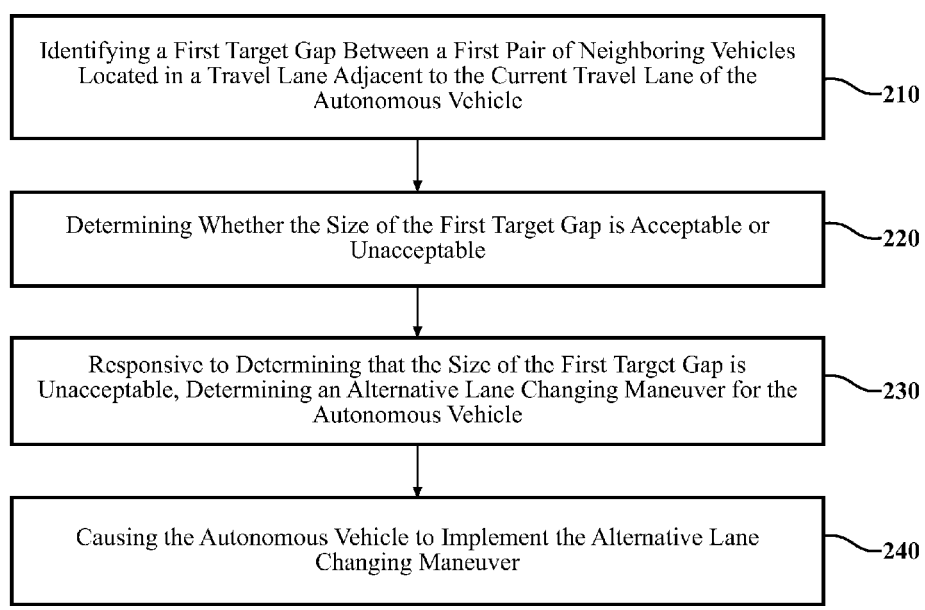
FIG. 2 is an example of a method of changing travel lanes for an autonomous vehicle.

Now that the various potential systems, devices, elements and/or components of the vehicle 100 have been described, various methods for changing travel lanes for an autonomous vehicle will now be described. Referring now to FIG. 2, an example of a method of changing travel lanes for an autonomous vehicle is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, a first target gap between a first pair of neighboring vehicles located in a travel lane adjacent to the current travel lane of the autonomous vehicle can be identified. In one or more arrangements, the first target gap can be identified based on data captured by the one or more sensors of the sensor system 125. The identifying of the first target gap can be performed by the processor 110, the lane changing module 137, and/or the autonomous driving module 120. The identifying of the first target gap can be based on one or more factors, as described herein. The method 200 can continue to block 220. If no objects are detected in the external environment, the method 200 can return to block 210, or the method 200 can end.

At block 220, it can be determined whether the size of the first target gap is acceptable or unacceptable. In one or more arrangements, the size of the first target gap and/or whether the size of the first target gap is acceptable can be determined based at least in part on data captured by the one or more sensors of the sensor system 125. The determining can be performed by the processor 110, the lane changing module 137, and/or the autonomous driving module 120. Determining whether the size of the first target gap is acceptable or unacceptable can be based on one or more factors. Such a determination can be made by, for example, the lane changing module 137. The method 200 can continue to block 230.

At block 230, responsive to determining that the size of the first target gap is unacceptable, an alternative lane changing maneuver for the autonomous vehicle can be determined. The determining can be performed by the processor 110, the lane changing module 137, and/or the autonomous driving module 120. The method 200 can continue to block 240.

At block 240, the vehicle 100 can be caused to implement the alternative lane changing maneuver. In one or more arrangements, the processor 110, the lane changing module 137, and/or the autonomous driving module 120 can cause the vehicle 100 to implement the alternative lane changing maneuver. The processor 110, the lane changing module 137, and/or the autonomous driving module 120 can be operatively connected to one or more of the vehicle systems 145 to implement the alternative lane changing maneuver. In one or more arrangements, the processor 110, the lane changing module 137, and/or the autonomous driving module 120 can be operable to control the one or more actuators 140, which can control one or more of the vehicle systems 145 or portions thereof to implement the alternative lane changing maneuver.

When the alternative lane changing maneuver is implemented, the method 200 can end. Alternatively, the method 200 can return to block 210. As a further alternative, the method 200 can include additional and/or alternative blocks (not shown). For instance, the method 200 can include, responsive to determining that the size of the target gap is acceptable, causing the vehicle 100 to change travel lanes by maneuvering the vehicle into the target gap.

As another example, in one or more arrangements, a driver or other passenger of the vehicle 100 can be prompted to provide permission to implement the alternative lane changing maneuver. In some arrangements, such prompting may occur only if it is determined that there is sufficient time to receive a responsive input from the driver or passenger to implement the alternative lane changing maneuver.

The driver or other passenger can be prompted in any suitable manner. For instance, the prompt can be displayed on a display in the vehicle 100. Alternatively or in addition, the prompt can be audibly output to the driver or other passenger over one or more audial channels. Other forms of prompting can be used as an alternative or in addition to these forms of prompting.

The driver or passenger can grant or deny permission to implement the alternative lane changing maneuver in any suitable manner. For instance, the driver or passenger can input the grant or denial of permission using one or more components of the input system 130. As an example, the driver or passenger can provide an input through a touch screen, button, switch or other in-vehicle user interface element. In some arrangements, the driver or passenger can provide an input through engagement with one or more vehicle components (e.g., turn signal, brake pedal, gas pedal, etc.). A "user interface element" is defined as a component or a group of components that enables a user to interact with a machine. In one or more arrangements, the driver or passenger can provide an input by speaking whether permission is granted or denied.

If an input is received granting permission, the method 200 can continue to block 240 where, as noted above, the alternative lane changing maneuver can be implemented. If an input is received denying permission, then the vehicle 100 can take any suitable action, such as presenting a warning, switching to manual operation, determining a different alternative lane changing maneuver or a system default action.

If an input is not received from the driver or passenger, the vehicle 100 can be automatically caused to implement the alternative lane changing maneuver or another system default driving action. In some arrangements, a predetermined amount of time can be given for the driver or passenger to provide an input. The predetermined amount of time can be any suitable amount of time. The predetermined amount of time can vary depending on the circumstances in the environment. If an input is not received within the predetermined amount of time, the alternative lane changing maneuver can be implemented or another system default driving action can be implemented.

Various non-limiting examples of the operation of the vehicle 100 will now be described. A non-limiting example of the operation of the vehicle in accordance with a lane changing method will now be described in relation to FIGS. 3A-3C. For purposes of this example, the vehicle 100 can be traveling in a driving environment 300. The vehicle 100 can be traveling on a road 305. "Road" means a thoroughfare, route, path or way between two places and upon which a vehicle can travel. The road 305 may be paved or otherwise improved to facilitate travel by a vehicle thereon. In some instances, the road 305 may be unpaved or undeveloped. The road 305 may be a public road or a private road. The road 305 can include or be a part of one or more bridges, tunnels, supporting structures, junctions, crossings, interchanges, and toll roads.

For this example, the road 305 can include a first travel lane 310 and a second travel lane 315. A "travel lane" is a portion of a road that is designated for use by a single line of vehicles and/or a portion of a road that is being used by a single line of vehicles. In some instances, the one or more travel lanes 310, 315 can be designated by markings on the road 305 or in any other suitable manner. In some instances, the one or more travel lanes 310 may not be marked. It should be noted that the first and second travel lanes 310, 315 can be substantially adjacent to each other, as is shown in FIGS. 3A-3C. However, in some instances, the first and second travel lanes 310, 315 can be spaced from each other. The first and second travel lanes 310, 315 can be substantially parallel to each other along at least a portion of their lengths.

For purposes of this example, vehicles can move in or can be designated to move in a first direction 311 in the first travel lane 310. Vehicles can move in or can be designated to move in a second direction 316 in the second travel lane 315. The first direction 311 can be the same as the second direction 316, as is shown in FIG. 3A.

While FIGS. 3A-3B show an example in which the road 305 includes two travel lanes 310, 315, it will be understood that arrangements described herein are not limited to roads having two travel lanes. Indeed, arrangements described herein can be used in connection with roads having any number of travel lanes. Further, it should be noted that the vehicles in such other travel lanes can travel in or can be designated to travel in the same direction as the first or second direction 311, 316. Alternatively, the vehicles in such other travel lanes can travel in or can be designated to travel in a different direction than the first or second direction 311, 316.

In FIGS. 3A-3B, the current travel lane of the vehicle 100 can be the first travel lane 310. "Current travel lane" means a travel lane that a vehicle is traveling on at the present time. Based on the travel route of the vehicle 100, the vehicle 100 may be approaching a lane change trigger event. For instance, the lane change trigger event may be a right hand turn or a right hand exit that the vehicle 100 may need to make at some point in the future in accordance with the planned travel route of the vehicle 100. A right hand turn or exit are merely two examples of lane change trigger events and are provided merely to facilitate the description. Accordingly, it will be understood that arrangements described herein are not limited in this respect. Indeed, the lane change trigger event can be a left hand turn, a left hand exit, the ending of a travel lane, or a travel lane closure, just to name a few additional possibilities.

For purposes of this example, it will be assumed that an exit from the road 305 can be accessed from the second travel lane 315 only. That is, the exit cannot be accessed from the first travel lane 310. However, since the current travel lane of the vehicle 100 is not the second travel lane 315, the vehicle 100 will need to maneuver into the second travel lane 315 at a suitable distance before the exit.

The vehicle 100 can detect the environment 300, such as by using the sensor system 125. The vehicle 100 can detect the presence of one or more objects (e.g., vehicles 340, 350, 360) in the second travel lane 315. The vehicle 100 can determine a gap between one or more pairs of neighboring objects in the second travel lane 315. For example, the vehicle 100 can determine a gap between the vehicle 340 and the vehicle 350, and the vehicle 100 can determine a gap between the vehicle 350 and the vehicle 360. Such gaps can be considered to be candidate gaps.

Among the candidate gaps, the vehicle 100 can identify a target gap $G_T$. For this example, the target gap $G_T$ can be defined between the vehicle 340 and the vehicle 350. Thus, with respect to the target gap $G_T$, the vehicle 340 can be the rearward vehicle, and the vehicle 350 can be the forward vehicle.

Once the target gap $G_T$ is identified, the vehicle 100 can move within the first travel lane 310 to a location that is substantially aligned with the back end of the forward vehicle 350, as is shown in FIG. 3B. Such movement may include changing the speed of the vehicle 100. For instance, the vehicle 100 may increase its speed to move from its position relative to the forward vehicle 350 in FIG. 3A to its position relative to the forward vehicle 350 in FIG. 3B.

The vehicle 100 can control its speed so that it substantially matches the speed of the forward vehicle 350. In such case, the front end of the vehicle 100 can be substantially aligned with or slightly behind the back end of the forward vehicle 350, as is shown in FIG. 3B.

The signaling system 175 of the vehicle 100 can be activated to indicate an intention of the vehicle 100 to change travel lanes. For instance, as is shown in FIG. 3B, the right turn signal lights of the vehicle 100 can be activated. Thus, the rearward vehicle 340 and/or the driver of the rearward vehicle 340 can be apprised of the intention of the vehicle 100 to merge into the second travel lane 315.

The vehicle 100 can determine whether the target gap is $G_T$ acceptable or unacceptable for purposes of lane changing. Such determining can be performed continuously or periodically while the vehicle 100 substantially maintains its position relative to the forward vehicle 350 shown in FIG. 3B. In some instances, the target gap $G_T$ may already be acceptable. In such case, the vehicle 100 can be caused to maneuver from the first travel lane 310 to the second travel lane 315.

In some instances, the target gap $G_T$ may not initially be acceptable, but it can subsequently become acceptable. Accordingly, the vehicle 100 can substantially maintain the condition shown in FIG. 3B to determine whether the size of the target gap $G_T$ becomes acceptable. For instance, in response to the activation of the right turn signals of the vehicle 100, the rearward vehicle 340 may reduce its speed such that the size of the target gap $G_T$ increases, as is shown in FIG. 3C. In such case, the vehicle 100 can be caused to implement a lane changing maneuver from the first travel lane 310 to the second travel lane 315, as is shown in FIG. 3C.

However, in some instances, the target gap $G_T$ may be unacceptable and may not become acceptable prior to the vehicle 100 reaching the lane change trigger event. For instance, the driver of the rearward vehicle 340 may be an aggressive driver or may be unwilling to allow the vehicle 100 to merge into the second travel lane 315. Thus, according to arrangements described herein, the vehicle 100 can be configured to determine one or more suitable alternative lane change maneuvers. The one or more alternative lane change maneuvers can be less conservative lane change maneuvers.

A non-limiting example of the operation of the vehicle 100 in such a manner will now be described in relation to FIGS. 4A-4C. The above discussion with respect to the environment 300, the road 305, the travel lanes 310, 315, and the vehicles 340, 350, 360 can apply equally to the environment 400, the road 405, the travel lanes 410, 415, and the vehicles 440, 450, 460. Further, the above description with respect to FIGS. 3A and 3B can apply equally to FIGS. 4A and 4B. However, in this example, the rearward vehicle 440 does not change its speed or may increase its speed such that the size of the target gap $G_T$ decreases to an unacceptable size or remains an unacceptable size, as is shown in FIG. 4C. In such case, the vehicle 100 would not implement the standard lane changing maneuver described in connection with FIG. 3C. Instead, the vehicle 100 can determine an alternative lane changing maneuver.

Such alternative lane change maneuver can be a less conservative lane change maneuver. FIG. 4C shows an example in which the less conservative lane change maneuver is merging into the target gap $G_T$, despite the size of the target gap $G_T$ being smaller than the standard acceptable size for the target gap $G_T$. In such case, the target gap $G_T$ may be considered to be acceptable under a less conservative acceptable size for the target gap $G_T$. The less conservative acceptable size is less than the standard acceptable size for the target gap $G_T$. In such case, the vehicle 100 can be caused to implement a lane changing maneuver from the first travel lane 410 to the second travel lane 415, as is shown in FIG. 4C. The vehicle 100 can continue to detect the environment 400 so that that the lane changing can be safely implemented. If subsequent detections indicate that the lane changing cannot be safely implemented, then the less conservative driving maneuver can be discontinued or adjusted.

Figure 5A:
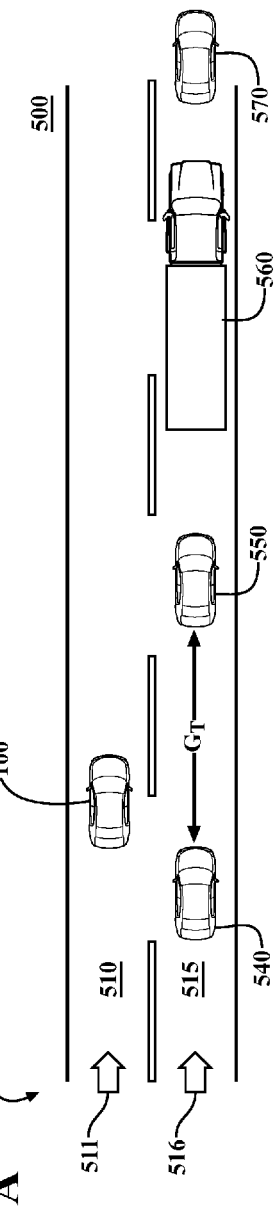
FIG. 5A-5C is an example of an autonomous vehicle configured to change travel lanes, showing the autonomous vehicle implementing still another example of a lane change operation.
Figure 5B:
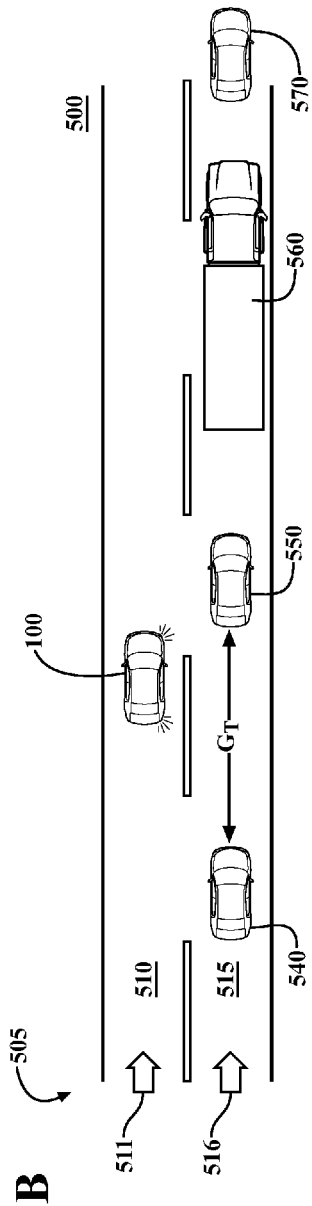
Figure 5C:
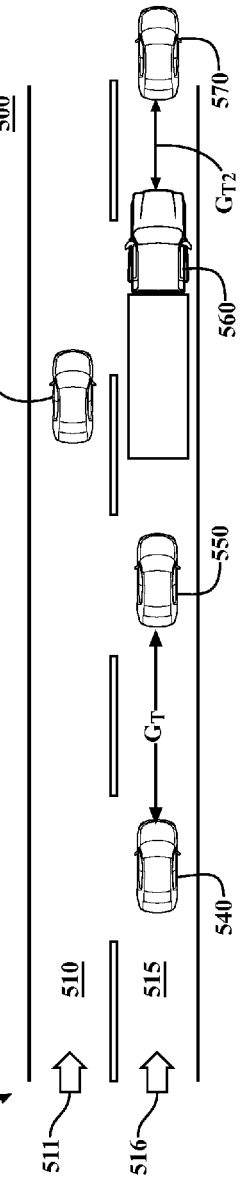

FIGS. 5A-5C show another example in which a less conservative driving maneuver is implemented by the vehicle 100. The above discussion with respect to the environment 300, the road 305, the travel lanes 310, 315, and the vehicles 340, 350 can apply equally to the environment 500, the road 505, the travel lanes 510, 515, and the vehicles 540, 550. Further, the above description with respect to FIGS. 3A and 3B can apply equally to FIGS. 5A and 5B. However, in this example, there can be an additional vehicle 570 in the second travel lane 515. Also, the vehicle 560 can be a large vehicle, such as a truck.

Referring to FIG. 5C, the vehicle 540 may not yield to the signaling by the vehicle 100. In this example, the vehicle 540 may increase its speed so that the size of the target gap $G_T$ can decrease. In such case, the vehicle 100 can determine that the size of the target gap $G_T$ is unacceptable. Accordingly, the vehicle 100 can determine an alternative lane changing maneuver. In this instance, the vehicle 100 can determine that the vehicle 560 is a large vehicle. For instance, the object identification module 135 can be used to determine that the vehicle 560 is a large vehicle in any suitable manner. The vehicle 100 may assume that the vehicle 560 is a relatively slow moving vehicle based on its size. Such an assumption can be confirmed by data acquired by the sensor system 125.

Thus, the vehicle 100 can identify a new target gap $G_T2$ that is located forward of the target gap $G_T$ in the travel direction 511, 516. The new target gap $G_T2$ may be defined by the large vehicle 560, or the new target gap $G_T2$ can be located forward of the large vehicle 560 in the travel direction 511, 516 and is not defined by the large vehicle 560. For purposes of this example, the new target gap $G_T2$ can be defined by the vehicle 570 and the large vehicle 560. The large vehicle 560 can be the rearward vehicle defining the new target gap $G_T2$.

The vehicle 100 can increase its speed to overtake the large vehicle 560, as is shown in FIG. 5C. The vehicle 100 can match its speed to the speed of the forward vehicle 570. The vehicle 100 can activate its signaling system to indicate a desire to change to the second travel lane 515. The vehicle 100 can repeat the process described above.

Still other alternative lane changing maneuvers are possible. Indeed, for example, the vehicle 100 can reduce its speed in its current travel lane to identify a new target gap that may be located behind the initial target gap. As another example, the vehicle 100 can identify a slow moving vehicle located forward of the target gap $G_T$ in the travel direction 511, 516. The vehicle 100 can increase its speed to overtake the slow moving vehicle to identify a new target gap. Thus, it will be understood that the alternative lane changing maneuvers are not limited to those described herein.

It will be appreciated that arrangements described herein can provide numerous benefits, including one or more of the benefits mentioned herein. For example, arrangements described herein can improve the performance of an autonomous vehicle. Further, arrangements described herein can provide for greater flexibility in the operation of the autonomous vehicle (e.g., by operating in a less conservative manner when a target gap is or becomes unacceptable). Arrangements described herein can provide such flexibility while maintaining safety for the vehicle, occupants of the vehicle, and/or other objects in the external environment of the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of changing travel lanes for an autonomous vehicle, the method comprising:
    identifying a first target gap between a first pair of neighboring vehicles located in a travel lane adjacent to a current travel lane of the autonomous vehicle;
    determining whether a size of the first target gap is acceptable or unacceptable;
    responsive to determining that the size of the first target gap is unacceptable, determining an alternative lane changing maneuver for the autonomous vehicle based at least partially on a distance between the autonomous vehicle and a lane change trigger event; and
    causing the autonomous vehicle to implement the alternative lane changing maneuver.

2. The method of claim 1, further including:
    responsive to determining that the size of the first target gap is acceptable, causing the autonomous vehicle to implement one or more maneuvers to merge into the first target gap.

3. A method of changing travel lanes for an autonomous vehicle, the method comprising:
    identifying a first target gap between a first pair of neighboring vehicles located in a travel lane adjacent to a current travel lane of the autonomous vehicle;
    determining whether a size of the first target gap is acceptable or unacceptable;
    responsive to determining that the size of the first target gap is unacceptable, determining an alternative lane changing maneuver for the autonomous vehicle, the alternative lane changing maneuver being a less conservative lane changing maneuver; and
    causing the autonomous vehicle to implement the alternative lane changing maneuver.

4. The method of claim 3, wherein the less conservative lane changing maneuver includes safely maneuvering the autonomous vehicle into the first target gap when the size of the first target gap is less than a predetermined size for standard lane changing.

5. A method of changing travel lanes for an autonomous vehicle, the method comprising:
    identifying a first target gap between a first pair of neighboring vehicles located in a travel lane adjacent to a current travel lane of the autonomous vehicle;
    determining whether a size of the first target gap is acceptable or unacceptable;
    responsive to determining that the size of the first target gap is unacceptable, determining an alternative lane changing maneuver for the autonomous vehicle, the alternative lane changing maneuver including:
        identifying a second target gap between a second pair of neighboring vehicles located in a travel lane adjacent to the current travel lane of the autonomous vehicle, the first pair of neighboring vehicles being different than the second pair of neighboring vehicles, the second target gap being located forward of the first target gap in a travel direction of the travel lane adjacent to the current travel lane of the autonomous vehicle;
        identifying a large vehicle in the travel lane adjacent to the current travel lane of the autonomous vehicle, wherein the second target gap is located forward of the large vehicle; and
        passing the large vehicle; and
    causing the autonomous vehicle to implement the alternative lane changing maneuver.

6. A method of changing travel lanes for an autonomous vehicle, the method comprising:
    identifying a first target gap between a first pair of neighboring vehicles located in a travel lane adjacent to a current travel lane of the autonomous vehicle;
    determining whether a size of the first target gap is acceptable or unacceptable;
    responsive to determining that the size of the first target gap is unacceptable, determining an alternative lane changing maneuver for the autonomous vehicle, the alternative lane changing maneuver including:
        identifying a second target gap between a second pair of neighboring vehicles located in a travel lane adjacent to the current travel lane of the autonomous vehicle, the first pair of neighboring vehicles being different than the second pair of neighboring vehicles, the second target gap being located forward of the first target gap in a travel direction of the travel lane adjacent to the current travel lane of the autonomous vehicle;
        identifying a slow vehicle in the travel lane adjacent to the current travel lane of the autonomous vehicle, wherein the second target gap is located forward of the slow vehicle; and
        passing the slow vehicle; and
    causing the autonomous vehicle to implement the alternative lane changing maneuver.

7. A method of changing travel lanes for an autonomous vehicle, the method comprising:
    identifying a first target gap between a first pair of neighboring vehicles located in a travel lane adjacent to a current travel lane of the autonomous vehicle, the first pair of neighboring vehicles including a forward vehicle and a rear vehicle;
    controlling the speed of the autonomous vehicle so that it is substantially the same as the speed of the forward vehicle;
    controlling the location of the autonomous vehicle so that it is near a back end of the forward vehicle;
    determining whether a size of the first target gap is acceptable or unacceptable;

responsive to determining that the size of the first target gap is unacceptable, determining an alternative lane changing maneuver for the autonomous vehicle; and causing the autonomous vehicle to implement the alternative lane changing maneuver.

8. A system for changing travel lanes for an autonomous vehicle, the system comprising:
- a sensor system operable to detect objects in an external environment of the autonomous vehicle;
- a processor operatively connected to the sensor system, the processor being programmed to initiate executable operations comprising:
  - identifying a first target gap between a first pair of neighboring vehicles located in a travel lane adjacent to a current travel lane of the autonomous vehicle;
  - determining whether a size of the first target gap is acceptable or unacceptable;
  - responsive to determining that the size of the first target gap is unacceptable, determining an alternative lane changing maneuver for the autonomous vehicle based at least partially on a distance between the autonomous vehicle and a lane change trigger event; and
  - causing the autonomous vehicle to implement the alternative lane changing maneuver.

9. A system for changing travel lanes for an autonomous vehicle, the system comprising:
- a sensor system operable to detect objects in an external environment of the autonomous vehicle;
- a processor operatively connected to the sensor system, the processor being programmed to initiate executable operations comprising:
  - identifying a first target gap between a first pair of neighboring vehicles located in a travel lane adjacent to a current travel lane of the autonomous vehicle;
  - determining whether a size of the first target gap is acceptable or unacceptable;
  - responsive to determining that the size of the first target gap is unacceptable, determining an alternative lane changing maneuver for the autonomous vehicle, the alternative lane changing maneuver being a less conservative lane changing maneuver; and
  - causing the autonomous vehicle to implement the alternative lane changing maneuver.

10. The system of claim 9, wherein the less conservative lane changing maneuver includes safely maneuvering the autonomous vehicle into the first target gap when the size of the first target gap is less than a predetermined size for standard lane changing.

11. A system for changing travel lanes for an autonomous vehicle, the system comprising:
- a sensor system operable to detect objects in an external environment of the autonomous vehicle;
- a processor operatively connected to the sensor system, the processor being programmed to initiate executable operations comprising:
  - identifying a first target gap between a first pair of neighboring vehicles located in a travel lane adjacent to a current travel lane of the autonomous vehicle;
  - determining whether a size of the first target gap is acceptable or unacceptable;
  - responsive to determining that the size of the first target gap is unacceptable, determining an alternative lane changing maneuver for the autonomous vehicle, the alternative lane changing maneuver including:
    - identifying a second target gap between a second pair of neighboring vehicles located in a travel lane adjacent to the current travel lane of the autonomous vehicle, the first pair of neighboring vehicles being different than the second pair of neighboring vehicles, the second target gap being located forward of the first target gap in a travel direction of the travel lane adjacent to the current travel lane of the autonomous vehicle;
    - identifying a large vehicle in the travel lane adjacent to the current travel lane of the autonomous vehicle, wherein the second target gap is located forward of the large vehicle; and
    - passing the large vehicle; and
  - causing the autonomous vehicle to implement the alternative lane changing maneuver.

12. A system for changing travel lanes for an autonomous vehicle, the system comprising:
- a sensor system operable to detect objects in an external environment of the autonomous vehicle;
- a processor operatively connected to the sensor system, the processor being programmed to initiate executable operations comprising:
  - identifying a first target gap between a first pair of neighboring vehicles located in a travel lane adjacent to a current travel lane of the autonomous vehicle;
  - determining whether a size of the first target gap is acceptable or unacceptable;
  - responsive to determining that the size of the first target gap is unacceptable, determining an alternative lane changing maneuver for the autonomous vehicle, the alternative lane changing maneuver including:
    - identifying a second target gap between a second pair of neighboring vehicles located in a travel lane adjacent to the current travel lane of the autonomous vehicle, the first pair of neighboring vehicles being different than the second pair of neighboring vehicles, the second target gap being located forward of the first target gap in a travel direction of the travel lane adjacent to the current travel lane of the autonomous vehicle;
    - identifying a slow vehicle in travel lane adjacent to the current travel lane of the autonomous vehicle, wherein the second target gap is located forward of the slow vehicle; and
    - passing the slow vehicle; and
  - causing the autonomous vehicle to implement the alternative lane changing maneuver.

13. A computer program product for changing travel lanes for an autonomous vehicle, the computer program product comprising a computer readable storage medium having program code embodied therein, the program code executable by a processor to perform a method comprising:
- identifying a first target gap between a first pair of neighboring vehicles located in a travel lane adjacent to a current travel lane of the autonomous vehicle;
- determining whether a size of the first target gap is acceptable or unacceptable;
- responsive to determining that the size of the first target gap is unacceptable, determining an alternative lane changing maneuver for the autonomous vehicle based at least partially on a distance between the autonomous vehicle and a lane change trigger event; and
- causing the autonomous vehicle to implement the alternative lane changing maneuver.

* * * * *